United States Patent
Freedenberg et al.

(10) Patent No.: US 7,089,198 B2
(45) Date of Patent: Aug. 8, 2006

(54) USER SELECTABLE EARTH IMAGERY ON-LINE E-COMMERCE AND FULFILLMENT SYSTEM

(75) Inventors: Candace Freedenberg, Leonardtown, MD (US); Jerome J. Wasilewski, Rochester, NY (US); David A. Parkes, Henrietta, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 656 days.

(21) Appl. No.: 09/934,037

(22) Filed: Aug. 21, 2001

(65) Prior Publication Data

US 2003/0040971 A1    Feb. 27, 2003

(51) Int. Cl.
*G06F 17/30* (2006.01)

(52) U.S. Cl. .............................. 705/27; 705/26; 705/52

(58) Field of Classification Search ................... 705/26, 705/27, 37, 52
See application file for complete search history.

(56) References Cited

U.S. PATENT DOCUMENTS

| | | | | |
|---|---|---|---|---|
| 4,870,576 A | * | 9/1989 | Tornetta ........................ | 705/1 |
| 5,634,012 A | * | 5/1997 | Stefik et al. ................... | 705/39 |
| 5,809,145 A | * | 9/1998 | Slik et al. ...................... | 705/52 |
| 5,956,027 A | * | 9/1999 | Krishnamurthy ............ | 715/760 |
| 6,125,329 A | * | 9/2000 | Place et al. ..................... | 702/5 |
| 6,597,818 B1 | * | 7/2003 | Kumar et al. ............... | 382/294 |
| 2001/0049648 A1 | * | 12/2001 | Naylor et al. ................. | 705/37 |

FOREIGN PATENT DOCUMENTS

WO    WO 92/02891    *    2/1992

OTHER PUBLICATIONS www.digitalglobe.com, EarthWatch Incorporated, Feb. 2, 1998.*
The website www.rsi.ca, RADARSAT Interactive, Mar. 4, 2000, (wayback machine).*

* cited by examiner

*Primary Examiner*—James McClellan
*Assistant Examiner*—M. Thein
(74) *Attorney, Agent, or Firm*—RatnerPrestia (57) ABSTRACT

A method is taught for offering for purchase user selected earth imagery content in the form of a photo product. The method comprises the steps of receiving earth imagery metadata from a plurality of earth imagery content providers; overlaying the earth imagery metadata on a mapping application provided by a service provider that offers earth imagery content; a user communicating over a channel with the service provider, the user locating a geographical area via the mapping application and dynamically selecting via the on-line interactive man-machine interface a desired geospatial area represented by one or more user defined polygons; converting the user-selected geospatial area represented by one or more polygons to a data string; and transmitting the data string over a channel to a fulfillment provider, the fulfillment provider generating a photo product of the desired geospatial area in a format selected by the user.

40 Claims, 8 Drawing Sheets

USER SELECTABLE EARTH IMAGERY ON-LINE E-COMMERCE AND FULFILLMENT SYSTEM

FIELD OF THE INVENTION

The present invention relates generally to methods and systems for offering earth imagery content and, more particularly, to a method of offering user-selected earth imagery content of a desired geospatial area in a user selected format.

BACKGROUND OF THE INVENTION

Historically business users with a need for precision earth imagery must contract local aerial fliers to capture and process the area of interest. This method of imagery acquisition and delivery is termed Contract-Buy.

The business user contracting the Contract-Buy of acquisition and delivery of imagery owns the resulting product but also bears the full cost of flight, planning etc. They are also subject to long lead times, as the flight needs to be planned around seasonsal weather conditions. In this case, purchaser and provider must jointly review the map coverage of the purchaser's area of interest. This requires the purchaser and provider physically be in the same place at the same time in order to review maps and flight plans. This is necessary to ensure that the flier acquires imagery of the exact desired area. Providers must establish a store-front square footage to support this sale.

With the availability of the internet and map applications, content providers or technology providers supporting content providers offer imagery purchasers the ability to understand what imagery is available by overlaying it on a mapping application. These systems are limited in that they offer viewing only, either of imagery or of availability of imagery based on meta data. They typically do not allow the user to select the imagery for purchase. In systems where the user may be prompted to select imagery, it is either catalog based or driven by constraints which require the user to select from some pre-defined grid structure where both the centerpoint of the area and the area is constrained, or the area is constrained to a fixed size, or lastly, the area is constrained to a fixed horizontal to vertical aspect ratio. These constraints limit the user in that they cannot acquire the actual geospatial area they desire. Catalog based systems not only constrain the user's area to a predefined location and size, they burden the user by requiring them to communicate their imagery needs in a form that is complex and foreign to them. Systems which constrain the user, preventing them from selecting their desired geospatial area, often result in the user having to specify a much larger geospatial area than they desire. This has the negative result of greater cost to the user as well as greater amounts of digital data to store and manage and, most importantly, increased laborious post processing in order to cut their desired area from the larger area provided.

Most prior art systems are further limited in that they do not take the user through the entire buy and fulfillment process. The user typically needs to fax the specified catalog number or call content provider's customer service personnel to facilitate a phone purchase. Upon receiving desired catalog number, the fulfiller must manually transcribe information to fulfill and deliver the order. Because of the complexity of communicating the data relating both to the geospatial area and to the imagery, this manual process is at risk for errors. Existing systems are also limited in that they typically may allow for presentation of one content but not of multiple content from multiple suppliers.

E-commerce engines in the market place today require loading of a catalog database with Store Keeping Units (SKU #'s) or catalog numbers. Therefore, content providers or technology providers serving content providers that may seek to offer the ability to purchase on-line need to require the customer to communicate their purchase in unfamiliar catalog numbers when using commercially available software.

The present invention provides a method and system that overcomes limitations of such prior art systems by allowing the user to locate a geographical area and select a desired geospatial area for imagery regardless of center point location, size, shape or complex catalog numbers. It allows users to complete the entire purchase on-line without extra steps of faxing or calling customer service. It removes unnecessary manual steps in fulfillment, such as transcribing lengthy catalog numbers and other information about the user's order. It makes use of a customized e-commerce system that can support the entire end-to-end earth imagery purchase process.

SUMMARY OF THE INVENTION

It is therefore an object of the present invention to provide a method that overcomes the limitations of the prior art systems by allowing the user to locate a geographical area and dynamically select a desired geospatial area for imagery without constraints on center point location, shape or size of area, and regardless of complex catalog numbers.

It is a further object of the present invention to provide a method which allows a user to select earth imagery content of a desired geospatial area for delivery as a photo product in a user selected format.

It is a further object of the present invention to provide a method to select earth imagery content of a desired geospatial area with user-verified visual confirmation throughout purchase process.

Yet another object of the present invention is to provide a method that allows users to complete the entire purchase on-line without extra steps of faxing or calling customer service.

Briefly stated, the foregoing and numerous other features, objects and advantages of the present invention will become readily apparent upon a review of the detailed description, claims and drawings set forth herein. These features, objects and advantages are accomplished by providing an end-to-end process of acquiring earth imagery content from industry content providers and identifying that earth imagery content in a standardized file or data string format using an on-line, interactive man-machine interface to locate a geographical area (via a map application), selecting and buying imagery covering the user's desired geospatial area over a channel, and then enabling fulfillment by one or more fulfillers of earth imagery content to generate a photo product of the user's desired geographical area in a format selected by the user.

The present invention enables the user to locate a geographical area and select a desired geospatial area of interest for earth imagery content. The desired geospatial area presents a substantially infinite number of geospatial area definitions that can be dynamically specified by the user while interacting with a visual on-line man-machine interface. The user's desired geospatial area is not constrained to a fixed area or breakdown or grid structure. Thus, a desired geospatial area is not limited in terms of location of center point, size, or shape. Resulting earth imagery content is therefore not limited to a number of SKU's. Furthermore, offering the user's choice in this manner, increases the intuitiveness of the earth imagery content purchase process. It is not necessary for the user to be knowledgeable of a complex product-numbering scheme to acquire earth imagery content.

Users should not need to understand Geospatial Information System (GIS) technology to get the information they need from imagery. Electronic files from GIS desktop applications can be submitted to identify the user's desired area of the earth. If the user has no experience with GIS applications the user interface simply walks the user through a step-by-step process.

The method of the present invention benefits the user by reducing costs, improving accessibility and reducing leadtime. It allows the user to locate, select, and buy on-line. The channel enables a broader audience to support upfront the mass speculative flying model from a financial investment standpoint. Mass speculative flying (vs Contract-Buy) inherently brings the cost per imagery unit or square mile down simply by the economies of scale. It also changes the ownership compared to the Contract-Buy model. The imagery thus can be resold multiple times causing the cost per purchase to be reduced. In addition, it allows for users to access the content through their own web browser without the need to mull over maps in real time with a content provider. And particularly, lead time is reduced with the method of the present invention compared to the Contract-Buy method as it enables selection of stock imagery and facilitates its transmission to fulfillment electronically.

The method of the present invention improves quality by employing a method submission, storage, display, dissemination, user selection, visual confirmation, purchase, transmission to fulfillers, distribution to fulfillers and printing of the earth imagery content via a networked communication system. Quality is first improved as the method of the present invention reduces potential errors in communicating complex information through the entire acquisition and distribution process. Secondly, quality is improved by putting the responsibility of verifying content display directly in the control of the content provider through on-line upload and verification of earth imagery content. Lastly, quality is improved by ensuring the user is responsible for confirming the desired geospatial area against available earth imagery content in one common system. This is advantaged over other methods where the desired area can be miscommunicated through the use of disparate systems, where errors can develop in transposing the desired area from one map application to another due to different projection systems being used or where the content provider does not record the desired area correctly following verbal discussions over paper maps.

Further advantages of the invention are the defined file formats allow multiple content to be presented and available to the user. Various content types and content varying in particlar features can all be presented in a similar manner. Each content type and/or dataset can be differentiated to the user based on the features the user specifies. The user is able to seek out the earth imagery content they need from one virtual location. Further, the content providers are able to submit and control their imagery presentation from their own desktop through the channel of the world wide web.

The method of the present invention reduces the need to continuously reproduce consumables in order to update end-users. It further reduces the need to continually update sales force and other personnel on information regarding available earth imagery content and the status of planned earth imagery content.

DETAILED DESCRIPTION OF THE INVENTION

Figure 1:
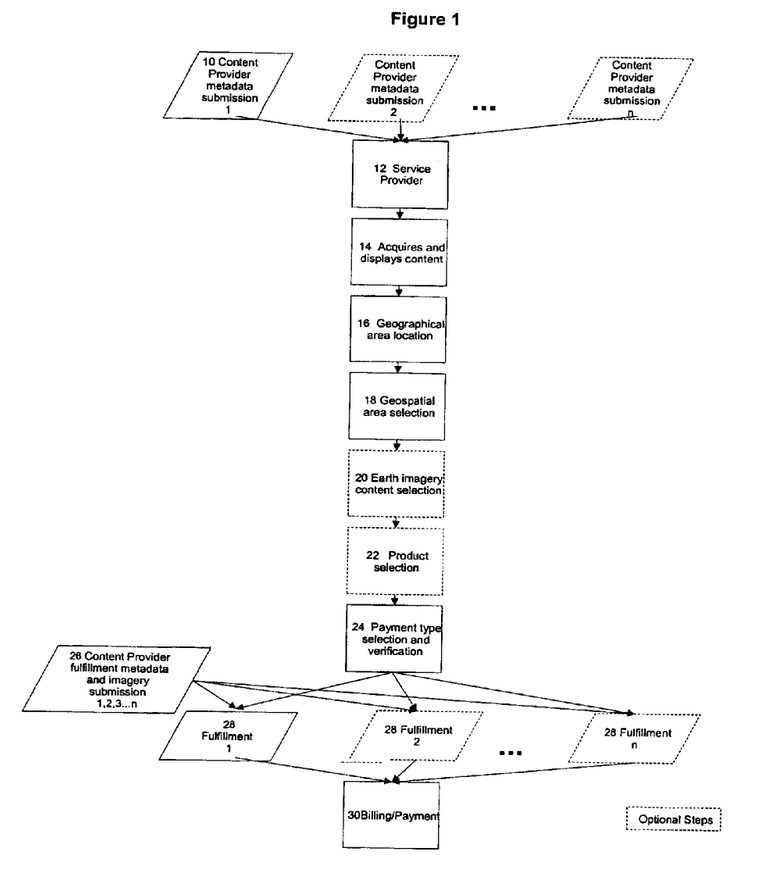
FIG. 1 is a High Level Systems Process Flow according to the present invention.

Turning first to FIG. 1 there is depicted a high-level flow chart of the process flow for method of the present invention. One or more content providers 10 are enabled by a service provider 12 to submit metadata, fulfillment metadata and imagery to a service provider site, the service provider being the entity aggregating and disseminating earth imaging data. The service provider 12 acquires such earth imagery content from a plurality of content providers 10 in a specified format and displays it as indicated by function box 14. The service provider 12 enables geospatial area location 16 by a user as indicated by function box 16. The service provider 12 further enables user-defined selection of desired geospatial area specified in function box 18. The user may optionally then be permitted selections of the desired earth imagery content and the desired product per function blocks 20 and 22 (shown in ghost to indicate such steps are optional), respectively. Next, payment type selection, entry, and verification are performed per function block 24. The service provider then enables fulfillment from one or more fulfillers per function block 26 who receive the requested metadata and imagery from the content provider per function block 28. Lastly, billing and payment is accomplished per function block 30.

Figure 2:
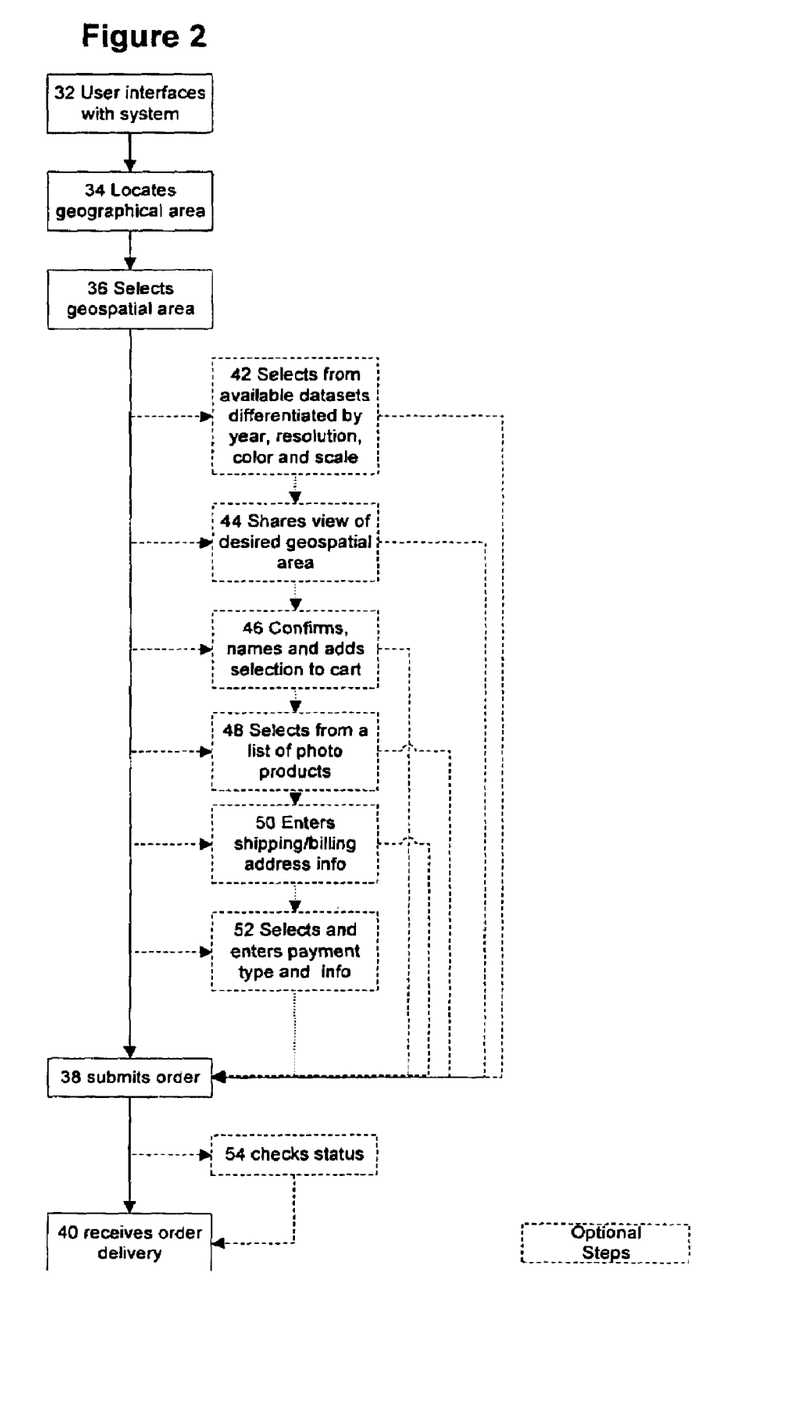
FIG. 2 is the Systems Process Flow from the User's Perspective according to the present invention.

It is important to understand the impact of the method of the present invention from the user's perspective as presented in FIG. 2 which provides a process flow diagram from the user's perspective. The user accesses the service provider's system using any available user interface channel such as, for example, the Internet (per function block 32). Alternatively, the channel may be a corporate intranet site on a local server with periodic updates.

The method of the present invention then requires the user to locate geographical area (per function block 34) and select a geospatial area of interest (per function block 36). Then, assuming the user has decided to purchase the selected desired geospatial area, the user submits the order (function block 38). The user then receives the ordered earth imagery (function block 40). This simplist embodiment of the method of the present invention is appropriate when a default earth imagery content and product type are employed. This minimal user process offers the user a clear process and time efficiency. It is feasible in a variety of cases. An example is when a user's billing and shipping information are predetermined by registration of a user name and password through pre-existing contracts, or when the service provider's system interfaces to a third party web site. When the user accessing the system is well known either by controlling access through a specific URL, third party linking partner, or intranet system presetting earth imagery content and single product choice may be desirable.

Optional system process steps from the user's perspective are shown in ghost in FIG. 2. Each of these steps may be offered independently or, one or more offered in sequential combination to meet a defined user-scenario offering. The steps presented include first the user selecting from available earth imagery content datasets differentiated by year, resolution, color and scale (function block 42). The user may share the view of geospatial area 16 selected with other individuals via a 'Send View' function (function block 44). The user may then confirm, name and add the selection (refers to geospatial area selected with either default or user selected earth imagery content) to the cart per function block 46. In appropriate user scenarios, the user then may select from products available per function block 48. The user then may enter the shipping and/or billing address information per function block 50. The user may next select the payment type and enter payment information per function block 52. In addition, the method may include a step that allows the user to check the status of his or her order (function block 54). This list of optional steps is not intended to be all-inclusive.

The 'Send View' feature (function block 44) allows the user to share their view of the desired geospatial area selected by e-mailing a URL string to an associate, client, service provider, customer service, or other individual. This allows all parties to view on-line the desired area at the same time as each other or at a time convenient for the recipient. An example of the exact string to enable the Send View feature is:

http://kei.kodak.com/cartselection. asp-
       ?polygonpts=36.9854736328125,
       −119.350834965706:36.9854736328125,−118.892489552498:
       36.7575073242188,−118.892489552498:36.7575073242188,
       −119.350834965706&polygonname=Select
       %20All %20Planned %20Imagery
       %20File&additionalframes=

The recipient receives a hyperlink with a session key that causes the above URL to open the interface to the referenced geospatial area.

Figure 3:
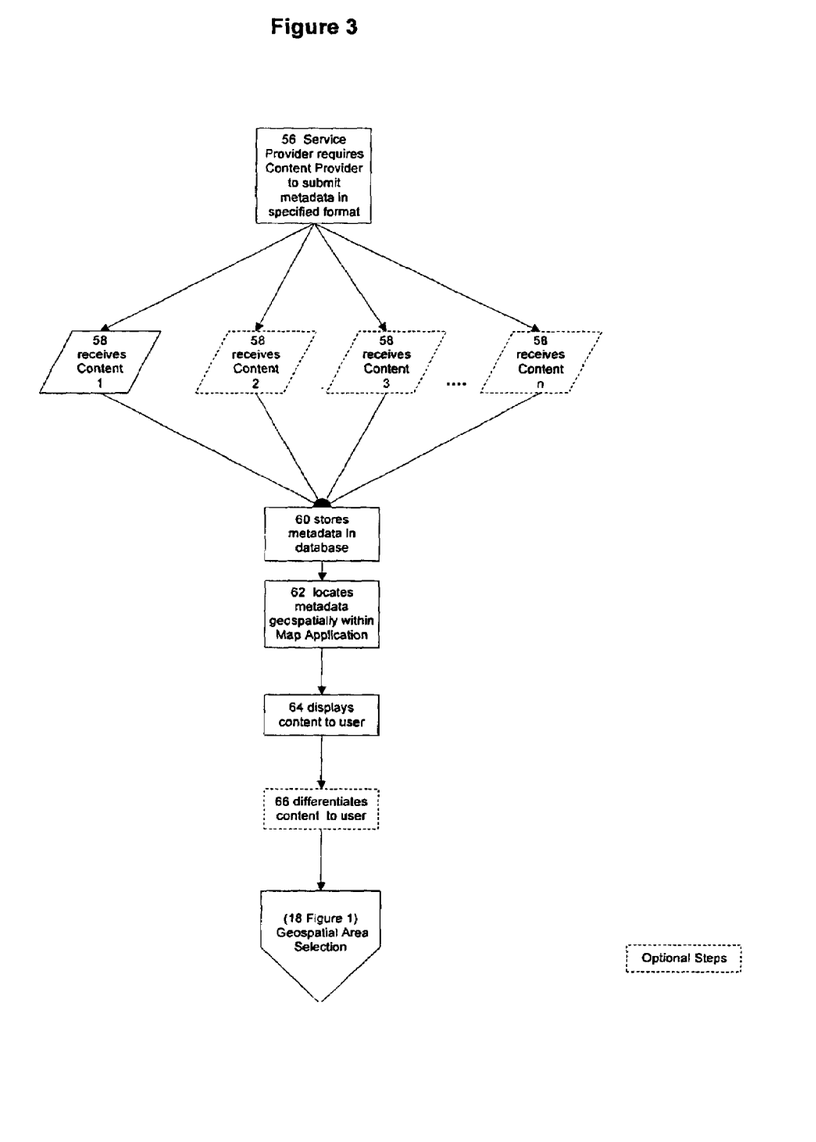
FIG. 3 is the Systems Process Flow detailing (Content Acquisition and Display) according to the present invention.

Turning next to FIG. 3, the earth imagery content acquisition and display step (function block 14 in FIG. 1) is presented in greater detail. The service provider requires the content provider to submit metadata in specified format per function block 56. Earth imagery content is imagery representing the earth's surface by a variety of acquisition means including, but not limited to, the following types: aerial, satellite, radar, ground-based capture, water-based capture, processed imagery, imagery derived information or video clips. Earth imagery content may represent both currently available and future planned data. Earth imagery content may be represented in the form of metadata or digital imagery data. Metadata describes the earth imagery content in a uniform manner. Metadata includes information pertinent to influence a user as to whether the imagery meets their needs. This metadata may include, for example, an image frame identifier, longitude and latitude of the center point of the imagery frame or unit, acquisition or production date and time, a general image area description, such as city or Metropolitan Statistical Area, and a data set descriptor. The image frame identifier may be a unique number differentiating that image frame from all others within the content provider's dataset. It may include, but is not limited to, content provider initials, year, country, data set and a multi-digit identifier. The multi-digit identifier for example could indicate a four-digit film roll number and a four-digit frame number, or the x, y coordinates of the lower left corner of the frame or imagery unit. By simply requiring that this identifier be unique per the content provider's dataset, the system remains flexible to allow a broad array of content providers to easily participate. The data set descriptor categorizes the earth imagery content based on resolution, scale, color vs. black and white, and the level of processing the imagery has received. The level of processing may indicate how accurate the pixels of the imagery are located with respect to geospatial datums, whether the imagery is fused to create a mosaic, or whether 3-D information is extracted. Other means of differentiating earth imagery content may be included in the metadata such as, for example, panchromatic, multi-spectral or hyper-spectral. Digital imagery data may be presented in the form of full or reduced resolution. It may be presented coincidental with the vector layers of the located geographical area defined by a map application or it may be presented in disparate but geospatially linked windows.

The service provider receives the content in specified metadata format from respective content providers per function block 58 and stores it in a content database per function block 60. The received metadata is then geospatially positioned within a Map Application per function block 62. The term "map application" as used herein is intended to mean an on-line interactive visual presentation of geographic data, a search engine and a geospatial database. This geographic data preferably includes: rendering of map vector layers (e.g. polygon points and lines outlining country, county, metropolitan statistical area and city areas, place names such as city, states, landmarks; highways, roads and streets; or highway numbers and street names). The search engine allows the user to locate geographical information based on spatial location by a variety of means including, but not limited to, search by city, Metropolitan Statistical Area and placename search; street address, zip code and phone exchange matching; look up latitude and longitude entry, or by navigational features enabling centering/zooming via mouse click or dragging within the map and/or panning and zooming via interactive tools. The geopsatial database is a database where all data included is referenced against geospatial points of a common reference system. The Map Application can be programmed to apply mathematical calculations to determine data of interest based on the relative data stored in the geospatial database. Such Map Applications are commercially available such as from Delorme located in Yarmouth, Me.

The service provider then displays content to the user per function block 64 and may optionally differentiate content to the user per function block 66 so that geospatial area location and selection can occur.

Figure 4:
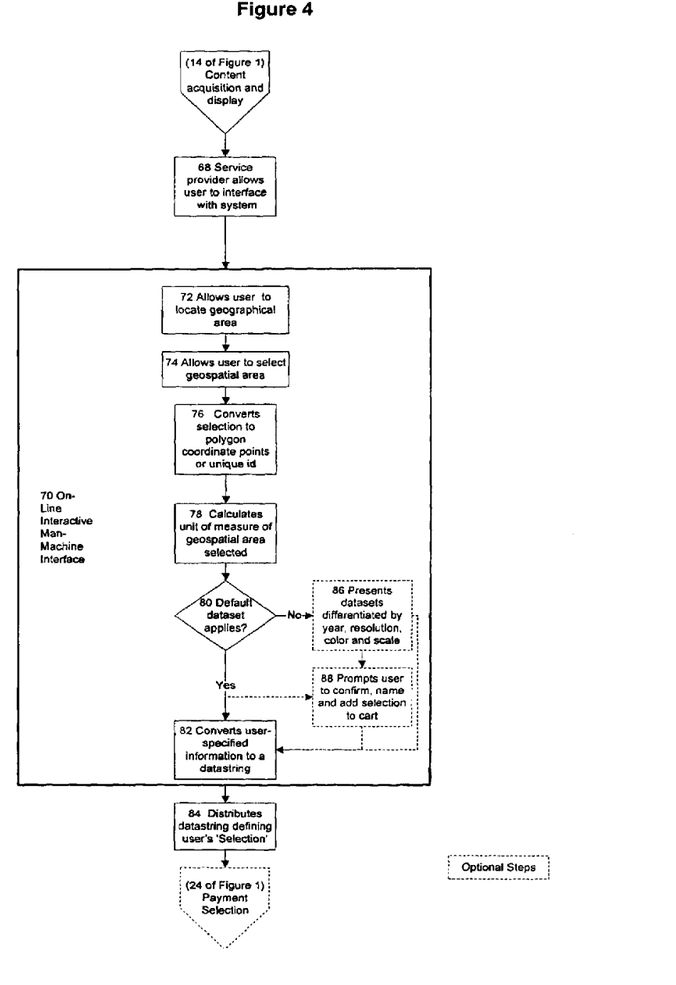
FIG. 4 is the Systems Process Flow detailing Geospatial Area Selection according to the present invention.

Turning next to FIG. 4 there is depicted a logic flow diagram for the software for geospatial area selection (function block 16 in FIG. 1) in the practice of the method of the present invention. The service provider allows the user to interface with the system (function block 68) via an on-line interactive man-machine interface (software performing the functions contained within box 70). This software allows the user to locate a geographical area using a Map Application (per functional box 72) and then select (per functional box 74) a desired geospatial area. Preferably, the on-line, interactive man-machine interface provides a visually active experience including, but not limited to:

(a) high-level, stepwise instructions for locating the geographical area via Map Appliction technology and selecting desired geospatial area for earth imagery content (1. Locate, 2. Select, 3. Confirm);

(b) user-friendly, detailed instructions for each high level step (for example, such user-friendly detailed instructions for Step 2. Select may include the following components:

i. Clearly written substeps with hyperlinks. A hyperlink brings the user to further direction if needed.

ii. Visual selection status indication. Visual selection status indication may include:

Red lines outlining multi-vector points of the user defined polygon;

Color differentiation for center point of selected imagery unit;

Quantitative data of select area value or number of imagery units, (c) a means to represent future planned vs. currently available imagery through visual indicators (e.g. Map Application rendering of available areas and planned areas differentiated by color);

(d) a means for visually differentiating earth imagery content by dataset features (e.g. Map Application employment of selectable pull down lists which drive map to a view rendered with an associated dataset); and (e) a means of dynamically selecting desired geographical area in user-defined polygon format to include but not limited to:

i. mouse interaction with the map to draw a polygon around geospatial area. The polygon may be drawn without limitation to center point location or limitation of the number of corner points thus providing substantially limitless size and shape variability;

ii. mouse interaction with the map to select one or group multiple imagery unit(s) depicted covering one or more more desired geospatial area (s). Such limitless combination of multiple groupings also provides substantially limitless size and shape variability;

iii. form field entry of a string of latitude, longitude polygon points defining geospatial area, (such string may be entered to significant decimal precision and points also providing substantially limitless size and shape variability);

iv. form field entry of center point and hypotenuse representing geospatial area; (method allows for variability of center point location where shape is limited to rectangle with fixed aspect ratio 30-60-90 triangle);

v. upload of digital file indicating user's desired geographical area size and shape limited only by constraints of third-party digital file format(e.g. ENVIRONMENTAL SYSTEMS RESEARCH INSTITUTE, INC. Shape File Format):

vi. "Select All Button", a one-click operation that defines the user-selected geospatial area based on all area within the current map view. Method allows for variability of center point location and shape is limited to fixed aspect ratio of screen presentation.

vii. unique identification entry of known imagery unit(s) (e.g. film roll-frame number—method fixes center point, size and shape of area selected).

The on-line, interactive man-machine interface software then converts the selection to polgyon coordinate points or unique identifier per function block 76 and calculates a unit of measure of geospatial area selected either in the form of dimensional area or frame count (function block 78). After calculating a unit of measure of geospatial area selected per function block 78, the on-line interactive man-machine interface software then determines whether a default dataset applies per decision block 80. If the answer out of decision block 80 is "yes" then the on-line, interactive man-machine interface software continues to convert the user-specified information into a data string as per function block 82. Next the on-line interactive man-machine interface converts the user-specified information defining the user's 'Selection' into a datastring per function block 82. The 'Selection' is made up of the data representing the user's potential input, as well as the system's data corresponding to user's selections. An example of the contents of the data string representing such a 'Selection' may consist of but is not limited to the following fields:

1. Polygon points defining the geospatial area in the form of 1at1,1 on1:1at2,1on2 . . . 1latn,11onn.
2. Area of geospatial area within polygon
3. Unique identifier for selected polygon containing imagery unit(s) in the form of frame 1:frame2
4. Image frame count (stereo frame count) if applicable)
5. Image frame count: (Mono), 0 if applicable
6. user specified name
7. city
8. state
9. Two character content provider code abbreviation
10. year
11. country
12. session key Each field is specified as a string, integer or decimal number as appopriate and separated by ascii dilemitter (|). The data string could be transmitted as an http request, sent by FTP or automatically populate a database via an html form interface.

Presented below are three (3) exemplary data strings:

1. "Select All" button selection (polygon points not null, frame count not null):

http://keiec.kodak.com/add_item.cfm?Delorme_
　Data=35.1174545288086,–106.67080 9030533:
　35.1174545288086,–106.558782100677:35.0604629516602,
　–106.558782100 677:35.0604629516602,
　–106.670809030533|25.46||38|19|Test+Select+
　All|Albuquerque |NM|HM|1998:1999:
　2000|USA|FCTPX|284cf827-98a0-436f-9f65-
　f7816f2a53c3", "CartWin dow","height=550,
　width=775,menubar,location,resizable,scrollbars,
　status, titlebar, toolbar");

2. Individual or group image selection (polygon points null, frame count not null):

http://preview2.logisoft.com/kodak_kei/webroot/ad-
　d_item.cfm?Delorme_Data=||5. 36|HM-2000-
　USA-2113-0435:HM-2000-USA-2113-0436:
　HM-2000-USA-2113-0437:HM-2000-USA-
　2113-0438:HM-2000-USA-2115-0182:HM-
　2000-USA-2115-0183:HM-2000-USA-2115-
　0184:HM-2000-USA-2115-
　0185|8|8|AirPort1|Dallas|TX|HM|1998:1999:
　2000|USA|FCTP X|328E02B6-CC1F-499D-
　BE46-4EB3D2F5261B 3. Individual or group image selection (polygon points null, frame count not null):

"http://keiec.kodak.com/
   add_item.cfm?Delorme_Data=||4|HM-2001-
   USA-1013-0173:HM-2001-USA-1013-0175:
   HM-2001-USA-1013-0200:HM-2001-USA-
   1013-0202|4|4|Polygon+Points +null
   %2FFrame+Coutn+Not+Null|San+
   Diego|CA|HM|1998:1999:2000|USA|FCTP
   X|90f7e1fc-a134-4e67-a0ce-6484d76260d9",
   "CartWindow","height=550,width=775,menubar,
   location, resizable,scrollbars,status,titlebar,tool-
   bar");

Lastly, the on-line, interactive man-machine interface software distributes data string embodying the user's 'Selection' (function block 84) for Payment Selection (24).

More complex embodiments of the on-line, interactive man-machine interface of the present invention may offer the user the capabilities or features present in the function blocks and decision block shown in ghost in FIG. 4. Each additional capability or feature may be offered independently or in sequential combination to meet a defined user-scenario offering. After calculating a unit of measure of geospatial area selected per function block 78, the on-line, interactive man-machine interface software then determines whether a default dataset applies per decision block 80. If the answer is no, the software will allow the user to select from available datasets differentiated by year, earth imagery content type, resolution, color and scale per function block 86. Regardless of the answer to decision block 80, the system may prompt the user to confirm, name, and add selection to cart per function block 88. This provides the user and service provider greater confidence in the user's selection and requires the user to have a proactive role by requiring them to name the selection to a title pertinent to their given project and by physically adding the item to the cart. If the answer out of decision block 80 is "yes", then the on-line, interactive man-machine interface software continues to convert the user-specified information into a data string as per function block 82.

By passing both stereo and mono frame count figures, the system offers the user access to imagery varying in coverage overlap. For example: stereo coverage of the earth ensures that each frame overlaps the next along one axis by 60%. This provides 3-Dimensional visual information such as building height. The user can extract this information from the stereo imagery. Mono coverage provides the assurance of full coverage by ensuring instead that each frame overlaps the next by only 10% in that same axis. In both cases, stereo and mono, the axis orthogonal to the axis of overlap, typically provides minimum overlap (10% for example) from one frame to the next in order to ensure uninterrupted coverage.

Figure 5:
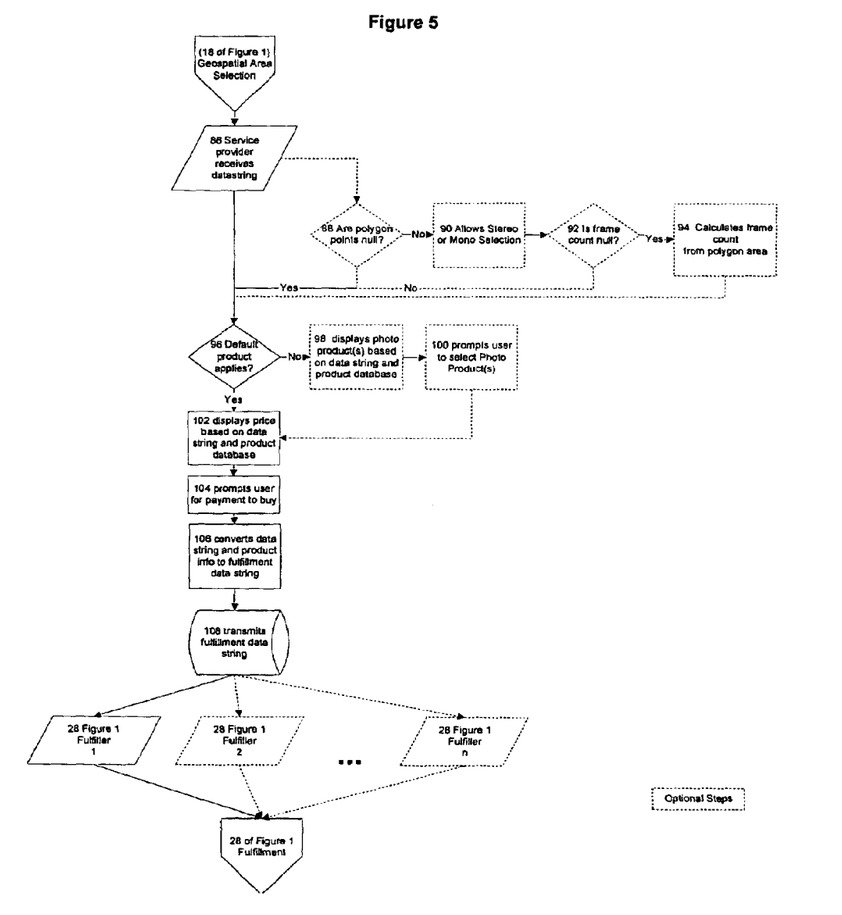
FIG. 5 is the Systems Process Flow detailing Payment Selection according to the present invention.

Looking next to FIG. 5 there is depicted a logic flow diagram for the payment selection portion of the method of this invention. This diagram includes the option of product selection. The service provider receives the data string per function box 86. Next, decision box 96 "Does default product apply?" is addressed. If the answer to decision box 96 is yes, then the price is displayed per function block 102. The price for Photo Product is based on data string and product database information.

The service provider then prompts the user for payment, allowing them to buy per function block 104. Payment may be made by multiple means including, but not limited to: credit card, purchase order, cash-on-delivery, direct contract subscription, or per click usage. Variations of the buy process include ability to allow user to purchase in local currency, receive tax exemptions and negotiated or promotional discounts.

Lastly, the user-selected information is converted to a fulfillment data string per function box 106. The fulfillment data string is subsequently transmitted per box 108 to one or multiple fulfillers for fulfillment as per function box 28. By way of example, the fulfillment data string may include but is not limited to: Order Date, Order ID Number, Order information, Shipping Information, Billing Information, Item Selection Information, Shipping, Tax, Tax #, Tarriff and Order values. Three exemplary data strings are presented in the attached appendix.

FIG. 5 also shows optional services (in ghost) the service provider may include. After receiving the data string per function box 86, the software and systems may determine whether the polygon points in the data string are null as indicated by decision box 88. If the decision is "yes", then the software and system continue to decision box 96. If the answer is "no", meaning polygon points exist, the system and software then may allow for selection of Stereo or Mono coverage within the area represented by the polygon points per function box 90. A determination is then made as to whether the frame count is null per decision box 92. If the decision is "yes" to decision box 92, then the software and system enable purchase of future planned imagery by calculating the frame count from the polygon area per function box 94. (For the example of coverage overlap is 60% in one axis and 10% in the perpendicular axis, stereo frame count =area /0.67 and mono frame count =area/1.38). Reference example 3 of Appendix for a planned imagery selection data string is defined by polygon points not null/Frame Count null.

If the answer is "no" to decision box 92, the system and software continue to the next decision box 96 "Does default product apply". If the answer is "yes" to decision box 96, the system continues to display price of specific default product as stated earlier. If the answer is "no" to decision box 96, then the system may display Photo Product(s) based on data string and product database information. The Photo Product is the selected earth imagery content of desired geospatial area in the format selected by the customer or by default. That format may be defined based on one or more of a variety of categories, such as for example:

(a) The level of processing desired is varied. The digital image pixels of the earth imagery content may be processed to geospatially locate to a datum representing the earth's surface and correct pixel location to varying degrees. Processes include, but are not limited to, a base process or non-georeferenced image, georeferenced image (default) where the center point is accurately located, a rectified image where building lean is corrected, a mosaic image where multiple frames area seamlessly positioned accurately together or an orthorectified image where all previous process are combined.

(b) The type of projection used for earth imagery representation is varied. A projection is a mathematical means of transferring information from the earth's three-dimensional curved surface to a two-dimensional medium—paper or a computer screen. It includes geographical projection choices of UTM (default) or State Plane.

(c) The datum to which processing is applied is varied. The datum is the identification given to surface of reference from which pixel locations are measured. It includes datum choices of NAD83 or WGS8f (default).

(d) The software reading format is varied. Formats presented may be ('iTiff (default), MR. CID, geoTiff, etc)
(e) The delivery media is varied. The delivery media which is the material means the photo product is fulfilled in such as hardcopy (including print [reproduced through optical or digital means] or diapositive) or soft copy (including compact disc [default], mini drive, enterprise server or streaming of data).
(f) Delivery (transmission) means of the Photo Product is varied. It is delivered via a choice of transmission means, including but not limited to, mail (default), e-mail of digital file, FTP of digital file, on-line view, on-line download, on-line use of
    digital file within desktop applications. Note that the default selection may change.

Further, additional features of the software may include availability of a visual reference to the area selected throughout the process, availability of data describing the selection, a preview of image capability for verification purposes, view of imagery overlaid on the map vector layers for the area selected and/or the capability to remove 'Selection' from cart.

Figure 6:
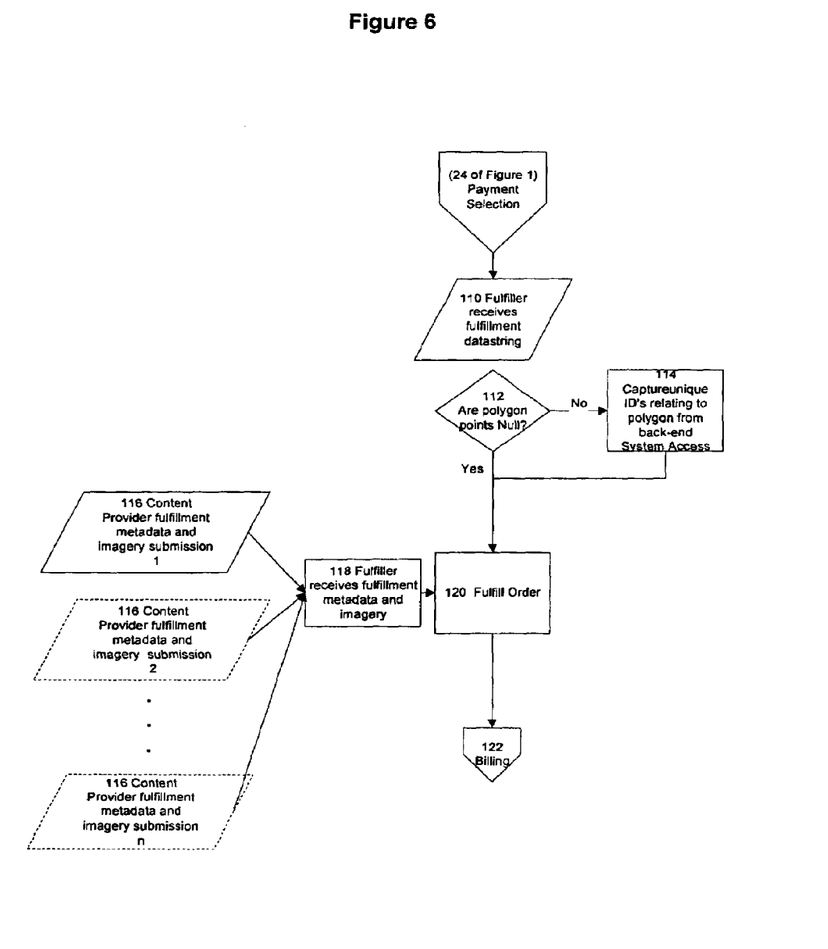
FIG. 6 is the Systems Process Flow detailing Fulfllment and Billing according to the present invention.

Looking next at FIG. 6, a logic flow diagram of the fulfillment portion of the method of the present invention is depicted. After payment selection, the fulfiller receives a fulfillment datastring per box 110. The software and system then determine whether the polygon points in the data string are null per decision box 112. If the answer is "yes", the system moves directly to the step of fulfilling the order per box 120. If the answer is "no", the system and software allows for the capture of unique ID's relating to the selected polygon from back-end system access per box 114. An example of the URL to access the back-end system is:

http://kei.kodak.com/
        mapdefault.asp?functionname=pointsinpoly&polygonpoint
        s=30.184249877929688,-81.6466064453125:
        30.256004,-81.646606:30.256004,-81.718109:
        30.186653,-81.719696:30.184250,-81.646606:
        30.184250,-
        81.646606&providercode=HM&returnpoints=true Separately, one or more content provider(s) submit fulfillment metadata and imagery to one or more fulfillers per boxes 116. The fulfiller receives fulfillment metadata and imagery per box 118. The step of fulfilling the order per box 120, of course, requires completion of the step of receiving metadata and imagery per box 118.

The fulfillment metadata provides information defining the earth imagery content in more detail than the imagery metadata submitted by content providers for presentation by the service provider as described earlier for the purpose of influencing a user as to whether the imagery meets their needs. The fulfillment metadata provides the necessary description for the fulfiller to fulfill the earth imagery content. The data associated consists of a general elements and additional elements that depend upon the earth imagery content type. The general elements, which apply to all content types, require a Unique File Identifier, Content Provider Abbreviation, Unique Product Identifier, Acquisition/Creation Date, Acquisition/Creation Time, Product Type, Product Format, Product Format Resolution, Product Compression, Datum/Reference Standard, scale used to capture content and measurement units used to acquire or create content. The additional elements for aerial earth imagery content, for example, may include things such as camera model/serial number, camera focal length, film type, ground elevation of nadir point, plane altitude and file size. The additional elements required for satellite earth imagery content type, for example, may include camera model/serial number, altitude at nadir, film type, locale, region or other image area descriptors including spatial coordinates. By supplying fulfillers with the fulfillment datastring and metadata as well as the imagery file, the Fulfiller can fulfill the order (function block 120).

Figure 7:
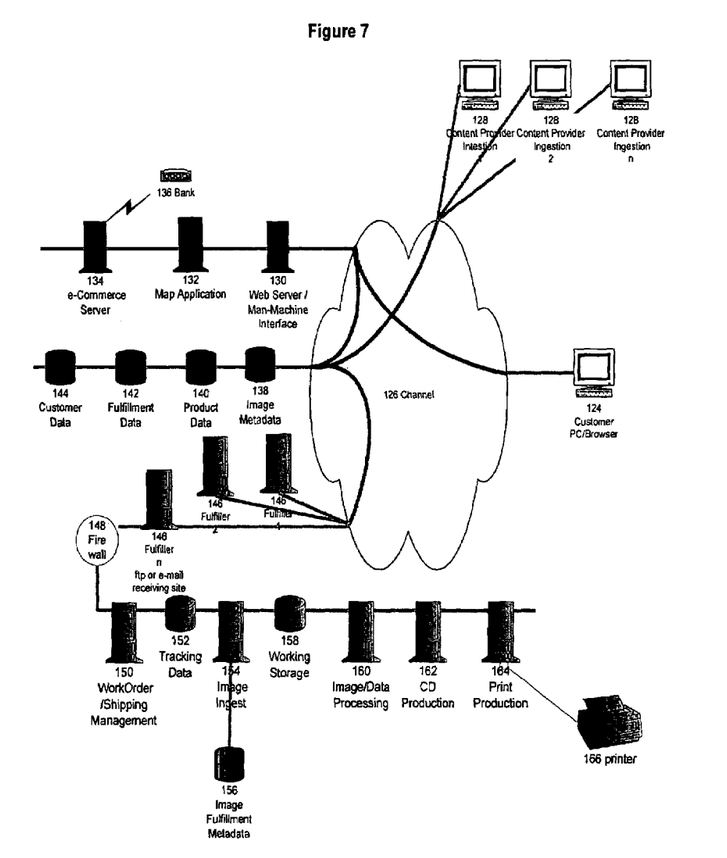
FIG. 7 is a diagram of a first embodiment of a system infrastructure architecture that may be used in the practice of the method of the present invention.

FIG. 7 provides an Infrastructure Architecture Diagram of a first embodiment of a system that can be used (Embodiment I) to practice the method of the present invention. First the Customer using a personal computer (pc) combined with a browser (124) is shown interfacing with a channel (126). One or more content provider(s) perform image metadata ingestion (128) interfacing the channel using similar pc's and browsers.

The service provider may employ the system in a commercial grade hosting environment which offers firewall protection, power supply back-up and redundant bandwidth. The web server/man-machine interface (130) serves both the web pages, with descriptive product information, as well as the on-line, interactive man-machine interface guiding the user for locating, selecting and buying their area of interest. Redundant servers may be used with load balancing technology to ensure responsiveness to traffic and high availability of service.

The Map Application sits on box 132. It pulls from proprietary databases to enable rendering of map and vector layers for the geographical area defined by the user. It also pulls data from the imagery metadata database (138) to display data sets available.

The e-commerce engine (134) could sit as its own box, have a load balanced back-up system or, it could be combined to physically sit with the web server/man machine interface (136). Embodiment I presents it as its own box. The e-commerce engine receives the data string from the on-line, interactive man-machine interface (130). It performs product list presentation to enable product selection if needed. It calculates and presents pricing, discounts, shipping costs, taxes and tariffs based on user's bill-to-country and selection. It offers payment selection, facilitates payment authorization and settlement of credit cards via interface with bank (138) and of purchase orders via interface to purchase order systems. It provides reporting on all site transactions. It interacts with databases storing for product data (140), fulfillment data (142), and customer data (144), as needed. It is the engine that sends fulfillment data string to approptriate fulfillers (146).

Image metadata (136) is stored using market available database tools. Other data such as product data (138), fulfillment data (142), or customer data (144) is stored by similar means. Data described could be combined into one database system. Data is accessible by the software systems as required. Redundant database systems may be deployed to provide greater responsiveness, high availability and redundancy in the case of failure.

One or more fulfillers (146) support receipt of fulfillment data string via ftp or e-mail receiving site. The fulfiller then delivers fulfillment behind a firewall (148). A work order/shipping management system (150) is used to automatically interpret user's selection from data string, pull appropriate earth imagery content from storage location, monitor and track the appropriate photo product processing and shipping. Order tracking data is stored in tracking database (152). An image ingestion server (154) supports ingestion of actual imagery supplied by content provider likely by tape, hard drive or other submission means. The image ingestion process pulls fulfillment metadata stored in the data base (156). While a given order is in process, a working storage (158) is used to manage the imagery and imagery metadata during the fulfillment process. Another server supports appropriate image and data processing (160). Lastly, imagery and data are processed for either hard copy (print production depicted with server 164) or soft copy (digital production for compact disc (CD) for example as depicted with server 162) or both sequentially. Print production is accomplished with printer(s) 166 offering multiple print sizes.

Figure 8:
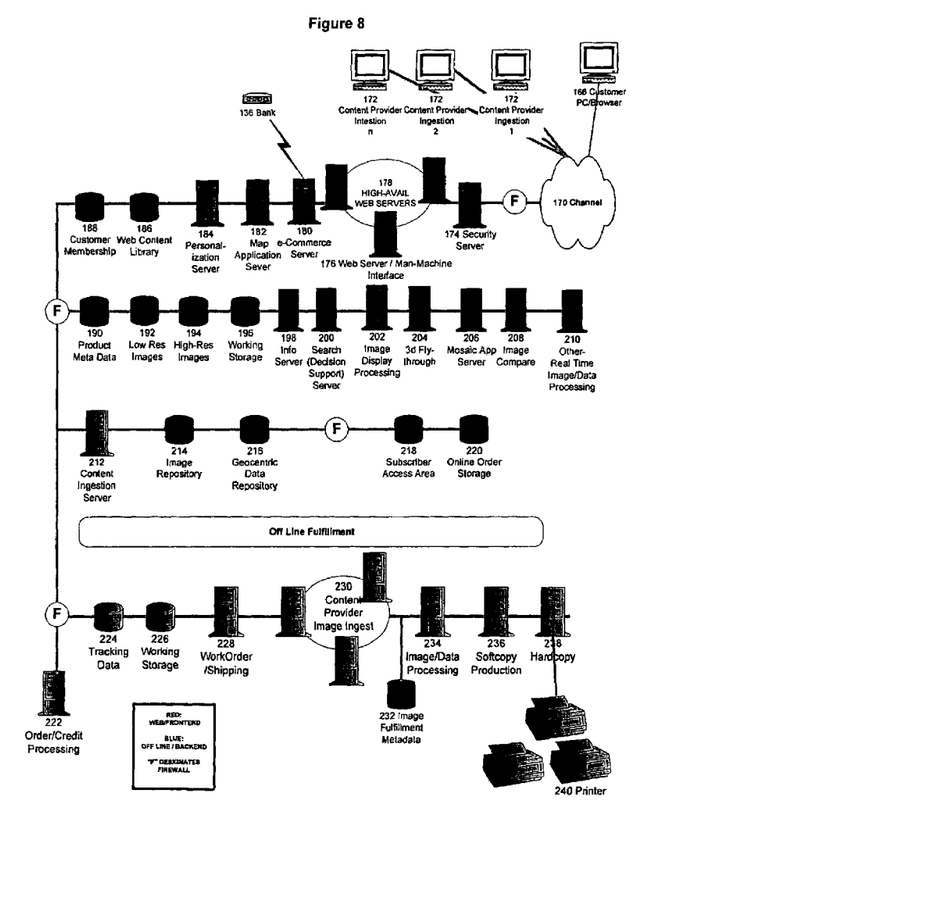
FIG. 8 is a diagram of a second embodiment of a system infrastructure architecture that may be used in the practice of the present invention.

FIG. 8 is an Infrastructure Architecture Diagram of a second embodiment (Embodiment II) of a system that can be used to practice the method of the present invention. This diagram shows in principle how Embodiment I depicted in FIG. 7 can be used as a foundation allowing expansion in features, applications and security and high availability apparatus presented in this invention. Red icons indicate systems or features that are part of the web front-end system. Blue icons indicate systems or features supporting back-end, off-line processing.

Similar to Embodiment I, the Customer, using a personal computer (pc) combined with a browser (168), is shown interfacing with a channel (170). One or more content provider(s) perform image metadata ingestion (172) interfacing the channel using similar pc's and browsers. Differing from Embodiment I, Embodiment II employs a Security Server (174) to further protect data available for on-line download and also user logon information. Embodiment II employs the Web Server/Man Machine Interface (176) of Embodiment I in a High Availability Web Server Configuration (178). Both the e-Commerce Server (180) and Map Application Server (182) are deployed similarly to Embodiment I. A Personalization Server (184) offers the ability to tailor the user's experience based on their particular needs or historical patterns. A Web Content Library database (186) offers the ability to efficiently manage html web content. A Customer Membership database (188) is employed in Embodiment II to store and manage customer information of members. Behind a Firewall (F), the Product Metadata database (190) is managed similar to Embodiment I. Additional databases are depicted in Embodiment II to manage imagery viewing via Low Resolution Imagery Data Storage (192) and High Resolution Imagery Data Storage (194) as well as on-line and off-line working storage (196). Embodiment II shows additional equipment necessary to deliver additional features relying on an Information server (198), Search or Decision Support Application Server (200), Image Display Processing Application Server (202), Three Dimensional (3-D) Image Presentation Application (204), Mosaic Application Server (206) and Image Comparison Application Server (208). Other real-time Image and/or Information Application Server(s) can be added to support yet more user interactive features as shown with server (210). A Firewall (F) secures the Content Ingestion Server (212) as used in Embodiment I. Additionally an Image Repository (214) and Geocentric Data Repository (216) may be employed. Embodiment II shows the user of a Subscriber Access Area (218) and On-line Order Storage (220) behind a firewall. The off-line fulfillment systems sitting behind the Firewall (F) in Embodiment II, includeOrder/Credit Processing (222) as well as those included in Embodiment I such as: Tracking Data (224), Working Storage (226), Work Order/Shipping Server (228), Content Provider Image Ingest (230), Image Fulfillment Data database (232), Image Data Processing Server (234), Softcopy Production (236)—delivers to subscriber access area or cd production, Hardcopy Production (238) and Printer(s) (240).

Earth Imagery Content can be fulfilled as a Photo Product in the user's desired format via optical or digital reproduction. It is delivered via multiple means including, but not limited to, mail, e-mail of digital file, FTP of digital file, on-line view, on-line download, on-line use of digital file within desktop applications. The Photo Product includes products, software and services based on earth imagery content. The digital image pixels of the earth imagery content may be processed to geospatially locate and correct them to varying degrees which define the Photo Product. Processes include, but are not limited to, a base process or non-georeferenced image, georeferenced image where the center point is accurately located, a rectified image where building lean is corrected, a mosaic image where multiple frames area seamlessly positioned accurately together, or an orthorectified image where all previous processes are combined. The Format of the Photo Product defines form and media in which the product is delivered. It includes varying forms such as geographical projection (UTM, state plane) or varying software reading formats ('iTiff, MR. CID, geoTiff etc) and/or varying media which is the material means in which product is fulfilled such as hardcopy (including print or diapositive) or soft copy (including compact disc, mini drive, enterprise server or streaming of data).

The method of present invention is currently being practiced to sell earth imagery over the internet The URL for the site is www.kodak.com/go/earthimaging. The website is owned and operated by Eastman Kodak Company. The website is hereby incorporated herein by reference.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

APPENDIX

1. Fulfillment datastring example 1: Polygon points not null, frame count not null:
Order No: 111016530
Remark Field:
Customer Account #: sample
Customer ID:
PO Number: sample
Order Date: 06/27/2001
BillTo Name: Allen Murray
BillTo Company: Eastman Kodak Company
BillTo Address1: 22132 Breton Woods Court
BillTo Address2:
BillTo Address3:
BillTo City: Leonardtown
BillTo State/Province: MD
BillTo Country: United States
BillTo Postal Code: 20650
BillTo Telephone: 301-997-1257
BillTo Email: amurra03@Harris.com
ShipTo Name: Candace Freedenberg
ShipTo Company: Eastman Kodak Company
ShipTo Address1: 22132 Breton Woods Court ShipTo Address2:
ShipTo Address3:
ShipTo City: Leonardtown
ShipTo State/Province: MD
ShipTo Country: United States
ShipTo Postal Code: 20650
ShipTo Telephone: 301-997-1257
ShipTo Email: candace.freedenberg@kodak.com
Shipping Method: Airborne: Second Day
Tax Exempt or VAT #:
SubTotal: $0.00
Shipping Value: $0.00
Discount: $0.00
Tax: $0.00
Tarriff: $0.00
Item1 Product: EGDI2X
Item1 Qty: 1
Item1 UnitPrice: $0.00
Item1 Line1:
Item1 Line2:
Item1 Line3:
Item1 No. of Stereo Frames: 13821
Item1 No. of Mono Frames: 0
Item1 Additional Frames1:
Item1 Additional Frames2:
Item1 Additional Frames3:
Item1 Additional Frames4:
Item1 Additional Frames5:
Item1 Additional Frames6:
Item1 Additional Frames7:
Item1 Additional Frames8:
Item1 Area: 9260.0699999999997
Item1 Polygon Points1: 38.8558115959167, −124.142520427704:38.8558115959167, −120.422887563705:37.0320811271667, −120.422887563705
Item1 Polygon Points2: 37.0320811271667, −124.142520427704
Item1 Polygon Points3:
Item1 UserNamed Area: Sample File Select All 13821 Images
Item1 Content Provider: HM
Item1 DataSet Year: 2001
Item1 DataSet Country: USA
2. Fulfillment data string example 2: Multiple Images Grouped to define polygon
Order No: 657299528
Remark Field:
Customer Account #: sample
Customer ID:
PO Number: Sample
Order Date: 6/27/2001
BillTo Name: Candace Freedenberg
BillTo Company: Eastman Kodak Company
BillTo Address1: 22132 Breton Woods Court
BillTo Address2:
BillTo Address3:
BillTo City: Leonardtown
BillTo State/Province: MD
BillTo Country: United States
BillTo Postal Code: 20650
BillTo Telephone: 301-997-1257
BillTo Email: amurra03@harris.com
ShipTo Name: Candace Freedenberg
ShipTo Company: Eastman Kodak Company
ShipTo Address1: 22132 Breton Woods Court
ShipTo Address2:
ShipTo Address3:
ShipTo City: Leonardtown
ShipTo State/Province: MD
ShipTo Country: United States
ShipTo Postal Code: 20650
ShipTo Telephone: 301-997-1257
ShipTo Email: candace.freedenberg@kodak.com
Shipping Method: Airborne: Second Day
Tax Exempt or VAT #:
SubTotal: $0.00
Shipping Value: $0.00
Discount: $0.00
Tax: $0.00
Tarriff: $0.00
Item1 Product: DOP
Item1 Qty: 1
Item1 UnitPrice: $0.00
Item1 Line 1:
Item1 Line2:
Item1 Line3:
Item1 No. of Stereo Frames: 0
Item1 No. of Mono Frames: 7
Item1 Additional Framesb 1: HM-2001-USA-1011-0368: HM-2001-USA-1011-0369:HM-2001-USA-1011-0370:HM-2001-USA-1013-0173:HM-2001-USA-1013-0174:HM-2001-USA-1013-0175:HM-2001-USA-1013-176
Item1 Additional Frames2:
Item1 Additional Frames3:
Item1 Additional Frames4:
Item1 Additional Frames5:
Item1 Additional Frames6:
Item1 Additional Frames7:
Item1 Additional Frames8:
Item1 Area: 4.6899999999999995
Item1 Polygon Points1:
Item1 Polygon Points2:
Item1 Polygon Points3:
Item1 UserNamed Area: Test of Multi-frame (7)
Item1 Content Provider: HM
Item1 DataSet Year: 2001
Item1 DataSet Country: USA
3. A planned imagery selection datastring is defined by polygon points not null /Frame Count null. For example:
OrderNo: 168841531
Remark Field:
Customer Account #: sample
Customer ID:
PO Number: Sample
Order Date: 06/27/2001
BillTo Name: Allen Murray
BillTo Company: Eastman Kodak Company
BillTo Address1: 22132 Breton Woods Court
BillTo Address2:
BillTo Address3:
BillTo City: Leonardtown
BillTo State/Province: MD
BillTo Country: United States
BillTo Postal Code: 20650
BillTo Telephone: 301-997-1257
BillTo Email: Candace.freedenberg@kodak. com
ShipTo Name: Candace Freedenberg
ShipTo Company: Eastman Kodak Company
ShipTo Address1: 22132 Breton Woods Court
ShipTo Address2:
ShipTo Address3:
ShipTo City: Leonardtown ShipTo State/Province: MD
ShipTo Country: United States
ShipTo Postal Code: 20650
ShipTo Telephone: 301-997-1257
ShipTo Email: candace.freedenberg@kodak.com
Shipping Method: Airborne: Second Day
Tax Exempt or VAT #:
SubTotal: $0.00
Shipping Value: $0.00
Discount: $0.00
Tax: $0.00
Tarriff: $0.00
Item1 Product: GDI
Item1 Qty: 1
Item1 UnitPrice: $0.00
Item1 Line1:
Item1 Line2:
Item1 Line3:
Item1 No. of Stereo Frames: 0
Item1 No. of Mono Frames: 289
Item1 Additional Frames1:
Item1 Additional Frames2:
Item1 Additional Frames3:
Item1 Additional Frames4:
Item1 Additional Frames5:
Item1 Additional Frames6:
Item1 Additional Frames7:
Item1 Additional Frames8:
Item1 Area: 398.69
Item1 Polygon Points1: 34.3569946289063, −118.823186635971: 34.3569946289063, −118.379631280899: 34.1290283203125,118.379631280899
Item1 Polygon Points2: 34.1290283203125, −118.823186635971
Item1 Polygon Points3:
Item1 UserNamed Area: Planned imagery File
Item1 Content Provider: HM
Item1 DataSet Year: 2001Item1 DataSet Country: USA

What is claimed is:

1. A method for offering for purchase by a computer earth imagery content of a user-selected desired geospatial area, the earth imagery content being delivered in the form of a photo product, the method comprising the steps of:
   (a) receiving earth imagery metadata from a plurality of earth imagery content providers and storing the earth imagery metadata in a plurality of databases;
   (b) overlaying the earth imagery metadata on a mapping application for display;
   (c) interacting, by a user, over a network channel with the mapping application, including locating a geographical area on a computer display via the mapping application, and selecting via an on-line, interactive man-machine interface a desired geospatial area represented by user defined polygons;
   (d) converting the user-selected geographical area represented by the user defined polygons to a data string;
   (e) transmitting the data string over a network channel to a fulfillment provider; and
   (f) generating by the fulfillment provider a photo product of the desired geographical area in a format selected by the user;
   wherein interacting via the on-line, interactive man-machine interface includes
   (i) viewing, by the user, geographic data on the computer display, including a map,
   (ii) locating, by the user, a spatial location on the map, and
   (iii) dynamically selecting, by the user, a geographical area, including the spatial location, enclosed by a user defined polygon, providing substantially limitless size and shape variability,
   (g) offering the user a choice of photo products;
   (h) a price and a delivery time of the photo product and a location of the fulfillment provider are dependent on the desired geospatial area and format selected; and
   (i) the price is automatically and proportionally determined by a computer of the fulfillment provider, in response to a size of dynamically selected polygons on the display of the user, and transmitted by the fulfillment provider, by way of the network channel, for display on the display of the user.

2. A method as recited in claim 1 wherein:
the data string includes a name specified by the user.

3. A method as recited in claim 1 wherein:
the data string further includes an earth imagery content provider code.

4. A method as recited in claim 1 wherein:
one or more polygons are identified by polygon points in the form of longitude and latitude coordinates.

5. A method as recited in claim 1 wherein:
one or more polygons is communicated by digital file containing user's desired area.

6. A method as recited in claim 1 wherein:
the channel is the internet.

7. A method as recited in claim 1 wherein:
the channel is a local server with direct remote access capability.

8. A method as recited in claim 1 wherein:
the data string further includes a year in which the earth imagery content provider acquired the earth imagery content.

9. A method as recited in claim 2 wherein:
the data string further includes a year in which the earth imagery content provider acquired the earth imagery content.

10. A method as recited in claim 2 wherein:
the data string further includes geospatial position of earth imagery content.

11. A method as recited in claim 10 wherein:
the data string further includes a year in which the earth imagery content provider acquired the earth imagery content.

12. A method as recited in claim 1 further comprising the steps of:
   (a) determining if the user selected earth imagery content is available through the on-line, interactive man-machine interface;
   (b) requesting a bid from at least one earth imagery content provider to obtain the user selected earth imagery content; and
   (c) communicating the bid to the user.

13. A method as recited in claim 1 wherein:
the photo product is at least one digital image.

14. A method as recited in claim 1 wherein:
the photo product is at least one printed image.

15. A method as recited in claim 1 further comprising the step of:
delivering the photo product to the user in the format selected by the user.

16. A method as recited in claim 13 wherein:
at least one digital image is delivered to the user on a computer readable storage medium.

17. A method as recited in claim 1 wherein:
the choice of products presented to user varies with the desired geospatial area selected.

18. A method as recited in claim 1 wherein:
the choice of photo products presented to the user varies with the geospatial area and/or format selected.

19. A method as recited in claim 1 further comprising the step of:
allowing the user to share a view of the desired geospatial area for earth imagery content selected with another party over the channel.

20. A method as recited in claim 1 further comprising the step of:
allowing the user to select stereo and mono coverage.

21. A method as recited in claim 1 further comprising the step of:
allowing the user to purchase planned imagery.

22. A method as recited in claim 1 wherein:
the on-line, interactive man-machine interface enables viewing of referenced selection and metadata throughout decision process.

23. A method as recited in claim 1 further comprising the step of:
capturing unique ID's relating to the desired geospatial area selected by the user from a back-end system access.

24. A method as recited in claim 1 wherein:
the user selects from earth imagery content available differentiated by year, color vs B&W, resolution, scale or precision processed form.

25. A method as recited in claim 1 further comprising the step of:
delivering the photo product to the user.

26. A method as recited in claim 1 wherein:
the channel is an intranet site located on a local server with periodic updates.

27. A method as recited in claim 1 further comprising the step of:
offering to allow payment for the product via the channel.

28. A method as recited in claim 1 further comprising the step of:
generating the photo product of the desired geospatial area for earth imagery content using the fulfillment data string combined with the fulfillment metadata of the earth imagery content selected.

29. A method as recited in claim 25 further comprising the step of:
the delivering step is performed by mail, e-mail of digital file, FTP of digital file, on-line view, on-line download, or on-line use of digital file within desktop applications.

30. A method as recited in claim 1 wherein:
the user defines the format of the photo product with respect to a level of processing, a geographical projection, a software reading format, and a delivery means.

31. A method as recited in claim 1 wherein:
the photo product is defined by a geographical projection selected.

32. A method as recited in claim 1 wherein:
the photo product is defined by a software reading format selected.

33. A method as recited in claim 1 wherein:
the photo product is defined by a delivery means selected.

34. A method as recited in claim 1 wherein:
the data string is transmitted as an http request, sent by FTP.

35. A method as recited in claim 1 wherein:
the data string automatically populates a database via an html form interface.

36. A method as recited in claim 1 wherein:
the content providers control quality and accuracy of the display of earth imagery content over the channel through on-line upload and verification of the earth imagery content.

37. A method as recited in claim 1 wherein:
the desired geospatial area represented by one or more user defined polygons is substantially infinitely variable as to a location, a size and a shape thereof.

38. A computer storage medium having instructions stored thereon for causing a computer to perform the method of claim 1.

39. A computer program product comprising:
a computer readable storage medium having a computer program stored thereon for performing the method steps of claim 1.

40. A computer method for offering for purchase user-selected earth imagery content of a desired geospatial area in the form of a photo product comprising the steps of:
(a) receiving, by a computer, earth imagery metadata from a plurality of earth imagery content providers;
(b) overlaying the earth imagery metadata on a mapping application, the earth imagery metadata provided by a service provider;
(c) communicating, by a user, over a network channel with the service provider, the user locating a geographical area via the mapping application and dynamically selecting via an on-line, interactive man-machine interface a desired geospatial area represented by one or more user defined polygons;
(d) converting the user-selected geospatial area represented by one or more polygons to a data string;
(e) transmitting the data string over a network channel to a computer of the fulfillment provider; and
(f) the fulfillment provider generating a photo product of the desired geospatial area in a format selected by the user, based on the user defined polygons dynamically selected on a computer display of the user,
(g) offering the user a choice of photo products;
(h) proportionally determining in the computer of the fulfillment provider, a price for the desired geospatial area, in response to a size of the polygons selected by the user on the display of the user; and
(i) transmitting, from the fulfillment provider, by way of the network channel, the price for viewing on the display of the user, free-of any human intervention at a location of the fulfillment provider.

* * * * *